US007744959B2

(12) United States Patent
Bi et al.

(10) Patent No.: US 7,744,959 B2
(45) Date of Patent: Jun. 29, 2010

(54) INK-JET RECORDING MEDIUM FOR DYE- OR PIGMENT-BASED INK-JET INKS

(75) Inventors: Yubai Bi, San Diego, CA (US); Tienteh Chen, San Diego, CA (US); Eric Lee Burch, San Diego, CA (US); Sandeep Bangaru, San Diego, CA (US); Kimberly Zargarian, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/122,971

(22) Filed: May 19, 2008

(65) Prior Publication Data

US 2008/0220239 A1 Sep. 11, 2008

Related U.S. Application Data

(63) Continuation of application No. 11/110,106, filed on Apr. 19, 2005, now abandoned, which is a continuation-in-part of application No. 10/854,350, filed on May 26, 2004.

(51) Int. Cl.

| | |
|---|---|
| ***B05D 3/00*** | (2006.01) |
| *B41M 5/00* | (2006.01) |
| *B41M 5/392* | (2006.01) |
| *B41M 5/395* | (2006.01) |
| *C01B 33/00* | (2006.01) |
| *C01B 33/14* | (2006.01) |
| *C01B 33/148* | (2006.01) |

(52) U.S. Cl. ....................... 427/353; 427/256; 427/387; 427/394; 427/395; 428/327; 428/387; 428/394; 428/395; 428/404; 428/331; 428/332; 428/446; 428/452

(58) Field of Classification Search .................. 427/353
See application file for complete search history.

(56) References Cited

U.S. PATENT DOCUMENTS

| | | | | |
|---|---|---|---|---|
| 5,683,784 | A * | 11/1997 | Nakao et al. | 428/195.1 |
| 6,129,785 | A | 10/2000 | Schliesman et al. | |
| 6,492,005 | B1 * | 12/2002 | Ohbayashi et al. | 428/32.29 |
| 6,777,039 | B2 | 8/2004 | Koike et al. | |
| 7,223,454 | B1 | 5/2007 | Bringley et al. | |
| 2003/0219551 | A1 | 11/2003 | Burch et al. | |

FOREIGN PATENT DOCUMENTS

| | | | |
|---|---|---|---|
| EP | 1010666 | A1 * | 6/2000 |
| EP | 1 407 891 | A | 4/2004 |
| GB | 2 369 075 | A | 5/2002 |
| JP | 2000/239578 | A | 9/2000 |
| JP | 2002103801 | | 4/2002 |
| JP | 2002/225427 | A | 8/2002 |
| JP | 2002274022 | | 9/2002 |
| JP | 2002285056 | | 10/2002 |
| JP | 200340916 | | 2/2003 |
| JP | 2003335991 | A * | 11/2003 |
| WO | 99/29513 | A | 6/1999 |
| WO | 01/05599 | A | 1/2001 |
| WO | 01/81078 | A | 11/2001 |

OTHER PUBLICATIONS

Notice of JP OA Dated Jan. 25, 2010.

* cited by examiner

*Primary Examiner*—Michael Komakov
*Assistant Examiner*—Alexander Weddle

(57) ABSTRACT

The present invention is drawn to a method of preparing a porous media substrate, comprising combining metal or semi-metal oxide particulates with a polymeric binder, wherein the metal or semi-metal oxide particulates are associated with at least one water soluble coating formulation additive. At least a portion of the water soluble coating formulation additive i) is in the form of unreacted additive, or ii) generates undesired electrolytes. Additional steps include removing at least a portion of the unreacted additive or undesired electrolytes, either before or after combining the metal or semi-metal oxide particulates with the polymeric binder, thereby forming a refined coating composition; and applying the refined coating composition to a media substrate to form an ink-receiving layer having a porous surface.

18 Claims, No Drawings

INK-JET RECORDING MEDIUM FOR DYE- OR PIGMENT-BASED INK-JET INKS

This application is a continuation under 35 U.S.C. §120 of U.S. patent application Ser. No. 11/110,106, filed Apr. 19, 2005 now abandoned, entitled "Ink-Jet Recording Medium for Dye- or Pigment-Based Ink-Jet Inks," which is a continuation-in-part application of U.S. patent application Ser. No. 10/854,350, filed on May 26, 2004. The disclosures of said applications are hereby incorporated herein by reference as if reproduced in full below.

FIELD OF THE INVENTION

The present invention relates generally to ink-jet printing. More particularly, the present invention relates to the preparation of semi-metal or metal oxide-based media coatings for ink-jet applications.

BACKGROUND OF THE INVENTION

Ink-jet inks typically comprise an ink vehicle and a colorant, the latter of which may be a dye or a pigment. Dye-based ink-jet inks used in photographic image printing are almost always water-soluble dyes. As a result, such dye-based ink-jet inks are usually not very water fast, i.e. images tend to shift in hue and edge sharpness is reduced upon exposure to humid conditions, especially when printed on media substrates having a porous ink-receiving layer. In addition, images created from these water-soluble dye-based ink-jet inks tend to fade over time, such as when exposed to ambient light and/or air. Pigment-based inks on the other hand, allow the creation of images that are vastly improved in humid fastness and image fade resistance. Pigment based images, however, are inferior to dye-based ink-jet inks with respect to the desirable trait of color saturation and gloss uniformity.

Print media surfaces play a key role in fade properties, humid fastness, and the quality of ink-jet produced printed images. Thus, for a given ink, the degree of air fade, humid fastness, and image quality can be dependent on the chemistry of the media surface. As a result, many ink-jet inks can be made to perform better when an appropriate media surface is used. For example, pigment based ink can be very sensitive to media coating compositions. Images printed with pigment based ink on porous media usually exhibit haze, lower gloss, or even completely lose gloss (also referred to as degloss) at high ink density. There are also problems of air fade and humid fastness associated with dye-based ink-jet inks as well. The ability for a printed image to be handled and exhibit scratch resistance can also be poor if the media is not compatible with ink-jet inks, particularly pigment-based ink-jet inks.

As such, it would be an advancement in the art to provide images that exhibit high gloss and high gloss uniformity with both dye and pigment based ink. Without this degloss phenomena, the gloss uniformity can be significantly improved in appearance. Also because of tight packing of pigment colorants in pigment-based ink-jet inks, the scratch resistance of the printed image can be enhanced. Still further, color gamut, black density, and humid fastness for dye-based ink-jet inks can also be significantly improved.

SUMMARY OF THE INVENTION

In accordance with embodiments of the present invention, various methods can be used to provide coated media substrates that do not interact unfavorably with dye-based or pigment-based ink-jet inks. As such, a method of preparing a porous media substrate can comprise various steps. One step includes combining metal or semi-metal oxide particulates with a polymeric binder, wherein the metal or semi-metal oxide particulates are associated with at least one water soluble coating formulation additive. At least a portion of the water soluble coating formulation additive i) is in the form of unreacted additive, or ii) generates undesired electrolytes. A further step includes removing at least a portion of the unreacted additive or undesired electrolytes, either before or after combining the metal or semi-metal oxide particulates with the polymeric binder, thereby forming a refined coating composition. The refined coating composition is then applied to a media substrate to form an ink-receiving layer having a porous surface.

In an alternative embodiment, a media sheet can comprise a media substrate and a refined coating composition applied to the media substrate. The refined coating composition can include metal or semi-metal oxide particulates, a polymeric binder, and at least one water soluble coating formulation additive, wherein the water soluble coating formulation additive is present in the refined coating composition in amount less than an initial amount. The initial amount of the water soluble coating formulation additive includes i) an amount of unreacted additive or ii) generated undesired electrolytes. Thus, at least a portion of the unreacted additive or undesired electrolytes are removed from the initial amount prior to the refined coating composition being applied to the media substrate.

Additional features and advantages of the invention will be apparent from the following detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

"Image permanence" refers to characteristics of an ink-jet printed image that relate to the ability of the image to last over a period of time. Characteristics of image permanence include image fade resistance, water fastness, humid fastness, light fastness, smudge resistance, air pollution induced fading resistance, scratch and rub resistance, etc.

"Media substrate" or "substrate" includes any substrate that can be coated for use in the ink-jet printing arts including papers, overhead projector plastics, coated papers, fabric, art papers, e.g., water color paper, and the like.

"Porous media coating" typically includes inorganic particulates, such as silica or alumina particulates, bound together by a polymeric binder. Optionally, mordants and/or other additives can also be present. Such additives can be water soluble coating formulation additives including multivalent salts, such as aluminum chlorohydrate; organosilane reagents chemically attached or unattached to the inorganic particulates; and/or acidic components such as acidic crosslinking agents. An example of an acidic crosslinking agent that can be used to crosslink a polymeric binder, such as polyvinyl alcohol, is boric acid. The composition can be used as a coating for various media substrates, and can be applied by any of a number of methods known in the art. Additionally, such compositions can be applied in single layer or in multiple layers. If multiple layers are applied, then these multiple layers can be of the same or similar composition, or can be of different compositions.

The term “water soluble coating formulation additive” refers to ionic and/of other compositions that are added to coating compositions for preparative, coating, or performance enhancing purposes. Though useful for these purposes, unreacted or excess amounts of such materials that remain at resulting ink-receiving layers are undesirable with respect to print quality. Additionally, such materials often generate electrolytes or salts as a byproduct that is also undesirable with respect to print quality. For example, excess water soluble coating formulation additives or generated electrolytes/salts tend to coalesce or coagulate colorants of ink-jet inks upon printing, as well diminish image gloss. Examples of water soluble coating formulation additives include unreacted acidic crosslinking agents, unreacted or generated acids, unreacted or generated electrolytes/salts such as multivalent or high valent salts, and unreacted organosilane reagents. The removal of excess or generated amounts of such materials in general can improve color gamut of printed images, and particularly, the removal of salts can improve humid fastness. This removal process can occur prior to combining all of the coating composition components together, or can occur after all of the components are combined.

“Aluminum salt” refers to any of a number of salts, including aluminum chloride, aluminum chlorohydrate (ACH), Aluminum hydroxy sulfate, aluminum hydroxy nitrate, etc.

“Aluminum chlorohydrate,” “ACH,” “polyaluminum chloride,” “PAC,” “polyaluminum hydroxychloride,” or the like, refers to a class of soluble aluminum products in which aluminum chloride has been partly reacted with a base. The relative amount of OH compared to the amount of Al can determine the basicity of a particular product. The chemistry of ACH is often expressed in the form $Al_n(OH)_mCl_{(3n-m)}$, wherein n can be from 1 to 50, and m can be from 1 to 150. Basicity can be defined by the term m/(3n) in that equation. ACH can be prepared by reacting hydrated alumina $AlCl_3$ with aluminum powder in a controlled condition. The exact composition depends upon the amount of aluminum powder used and the reaction conditions. Typically, the reaction can be carried out to give a product with a basicity of 40% to 83%. ACH can be supplied as a solution, but can also be supplied as a solid.

There are other ways of referring to ACH, which are known in the art. Typically, ACH comprises many different molecular sizes and configurations in a single mixture. An exemplary stable ionic species in ACH can have the formula $[Al_{12}(OH)_{24}AlO_4(H_2O)_{12]}^{7+}$. Other examples include $[Al_6(OH)_{15}]^{3+}$, $[Al_8(OH)_{20}]^{4+}$, $[Al_{13}(OH)_{34}]^{5+}$, $[Al_{21}(OH)_{60}]^{3+}$, etc. Other common names used to describe ACH or components that can be present in an ACH composition include Aluminum chloride hydroxide (8CI); A 296; ACH 325; ACH 331; ACH 7-321; Aloxicoll; Aloxicoll LR; Aluminium hydroxychloride; Aluminol ACH; Aluminum chlorhydrate; Aluminum chlorohydroxide; Aluminum chloride hydroxide oxide, basic; Aluminum chloride oxide; Aluminum chlorohydrate; Aluminum chlorohydrol; Aluminum chlorohydroxide; Aluminum hydroxide chloride; Aluminum hydroxychloride; Aluminum oxychloride; Aquarhone; Aquarhone 18; Astringen; Astringen 10; Banoltan White; Basic aluminum chloride; Basic aluminum chloride, hydrate; Berukotan AC-P; Cartafix LA; Cawood 5025; Chlorhydrol; Chlorhydrol Micro-Dry; Chlorhydrol Micro-Dry SUF; E 200; E 200 (coagulant); Ekoflock 90; Ekoflock 91; GenPac 4370; Gilufloc 83; Hessidrex WT; HPB 5025; Hydral; Hydrofugal; Hyper Ion 1026; Hyperdrol; Kempac 10; Kempac 20; Kemwater PAX 14; Locron; Locron P; Locron S; Nalco 8676; OCAL; Oulupac 180; PAC; PAC (salt); PAC 100W; PAC 250A; PAC 250AD; PAC 300M; PAC 70; Paho 2S; PALC; PAX; PAX 11S; PAX 16; PAX 18; PAX 19; PAX 60p; PAX-XL 1; PAX-XL 19; PAX-XL 60S; PAX-XL 61S; PAX-XL 69; PAX-XL 9; Phacsize; Phosphonorm; (14) Poly(aluminum hydroxy) chloride; Polyaluminum chloride; Prodefloc AC 190; Prodefloc AL; Prodefloc SAB 18; Prodefloc SAB 18/5; Prodefloc SAB 19; Purachem WT; Reach 101; Reach 301; Reach 501; Sulzfloc JG; Sulzfloc JG 15; Sulzfloc JG 19; Sulzfloc JG 30; TAI-PAC; Taipac; Takibine; Takibine 3000; Tanwhite; TR 50; TR 50 (inorganic compound); UPAX 20; Vikram PAC-AC 100S; WAC; WAC 2; Westchlor 200; Wickenol 303; Wickenol CPS 325 Aluminum chlorohydrate $Al_2ClH_5O_5$ or $Al_2(OH)_5Cl.2H_2O$ or $[Al(OH)_2Cl]_x$ or $Al_6(OH)_{15}Cl_3$; $Al_2(OH)_5Cl]_x$ Aluminum chlorohydroxide; Aluminum hydroxychloride; Aluminum chloride, basic; Aluminum chloride hydroxide; $[Al_2(OH)_nCl_{6-n]m}$; $[Al(OH)_3]nAlCl_3$; or $Al_n(OH)_mCl_{(3n-m)}$ (where generally, $0 \leqq m \leqq 3n$); for example. In one embodiment, preferred compositions include aluminum chlorides and aluminum nitrates of the formula $Al(OH)_2X$ to $Al_3(OH)_8X$, where X is Cl or $NO_3$. In another embodiment, preferred compositions can be prepared by contacting silica particles with an aluminum chlorohydrate ($Al_2(OH)_5Cl$ or $Al_2(OH)Cl_5.nH_2O$). It is believed that contacting a silica particle with an aluminum compound as described above causes the aluminum compound to become associated with or bind to the surface of the silica particles. This can be either by covalent association or through an electrostatic interaction to form a cationic charged silica, which can be measured by a Zeta potential instrument.

“organosilane reagent” or “reagent” includes compositions that comprise a functional or active moiety which is covalently attached to a silane grouping. The organosilane reagent can become covalently attached or otherwise attracted to the surface of metal or semi-metal oxide particulates, such as silica or alumina. Examples of moieties that can provide a desirable function include anionic dye anchoring groups (such as amines, quaternary ammonium salts, etc.), ultraviolet absorbers, metal chelators, hindered amine light stabilizers, reducing agents, hydrophobic groups, ionic groups, buffering groups, or functionalities for subsequent reactions. The functional moiety portion of the organosilane reagent can be directly attached to the silane grouping, or can be appropriately spaced from the silane grouping, such as by from 1 to 10 carbon atoms or other known spacer groupings. The silane grouping of the organosilane reagent can be attached to inorganic particulates of the porous media coating composition through hydroxyl groups, halo groups, or alkoxy groups present on the reagent. Alternatively, in some instances, the organosilane reagent can be merely attracted to the surface of the inorganic particulates.

The term “ink-receiving layer(s)” refers to a layer or multiple coating layers that are applied to a media substrate, and which are configured to receive ink upon printing. As such, the ink-receiving layer(s) do not necessarily have to be the outermost layer, but can be a layer that is beneath another coating.

The term "about" when referring to a numerical value or range is intended to encompass the values resulting from experimental error that can occur when taking measurements.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

With this in mind, the present invention is drawn to a method of preparing a porous media substrate can comprise various steps. One step includes combining metal or semi-metal oxide particulates with a polymeric binder, wherein the metal or semi-metal oxide particulates are associated with at least one water soluble coating formulation additive. At least a portion of the water soluble coating formulation additive i) is in the form of unreacted additive, or ii) generates undesired electrolytes. A further step includes removing at least a portion of the unreacted additive or undesired electrolytes, either before or after combining the metal or semi-metal oxide particulates with the polymeric binder, thereby forming a refined coating composition. The refined coating composition is then applied to a media substrate to form an ink-receiving layer having a porous surface.

In an alternative embodiment, a media sheet can comprise a media substrate and a refined coating composition applied to the media substrate. The refined coating composition can include metal or semi-metal oxide particulates, a polymeric binder, and at least one water soluble coating formulation additive, wherein the water soluble coating formulation additive is present in the refined coating composition in amount less than an initial amount. The initial amount of the water soluble coating formulation additive includes i) an amount of unreacted additive or ii) generated undesired electrolytes. Thus, at least a portion of the unreacted additive or undesired electrolytes are removed from the initial amount prior to the refined coating composition being applied to the media substrate.

As discussed, images produced using either pigment-based ink-jet inks or dye-based ink-jet inks can be affected by the print media to which the ink is applied. In particular, pigment-based inks, which sometimes contain latex particulates and/or binders, can be very sensitive to undesired material that are often present in ink-receiving layers of print media. For example, water soluble coating formulation additives, such as acids, multivalent ions, or aluminum chlorohydrate, can be desired for the manufacture certain media coatings. However, these materials in excess, after the coating composition has dried to form an ink-receiving layer, can have undesired an affect on the ink-jet ink. Further, these and other similar materials, when added, can generate unwanted electrolytes or salts. For example, a coating composition prepared that includes semi-metal oxide or metal oxide particulates, polyvinyl alcohol, sodium borate, sodium hydroxide, and aluminum chlorohydrate results in unwanted sodium chloride salts. These and other ionic compositions can cause pigment coagulation to occur, resulting in a reduction or loss in gloss. In some cases, scratch resistance can become poor due to pigment interaction with such media surfaces. Additionally, unreacted boric acid, which is often used as a crosslinking agent to increase the binding strength of polyvinyl alcohol binder in semi-metal or metal oxide-based media coatings, can also be problematic in finished ink-receiving layers. Alternatively, with dye-based ink-jet inks, unreacted or excess water soluble coating formulation additives can reduce color chroma and black density, as well as reduce image gloss.

In accordance with this recognized problem, the present invention is drawn to specialty ink-jet media and methods of making the same, wherein generated, excess, or unreacted amounts of these ionic and/or other interfering water soluble components are at least partially removed to produce improved compatibility with ink-jet ink components, such as dyes and/or pigments. Printed images on such media have shown uniform and high gloss, as well as improved scratch resistance with pigment-based ink-jet inks.

In accordance with embodiments of the present invention, various methods can be used to provide coated media substrates that do not interact unfavorably with dye-based or pigment-based ink-jet inks. In some of the embodiments described herein, a water soluble coating formulation additive is typically included in a coating composition for improving at least one of a coating preparation property, a coating application property, or a media performance property. However, unreacted additive(s) or additive(s) that generate undesired electrolytes or salts can create printing difficulties, as previously set forth. There are at least two basic strategies of removing unreacted additive(s) or generated electrolytes or salts, including removing the additive(s)/generated electrolytes prior to application of a coating composition, or after application of a coating composition, i.e. after forming the ink-receiving layer. In accordance with the present invention, these unreacted additive(s) or generated electrolytes or salts are removed prior to application of the coating composition.

Turning to specific media coating components, with more specific reference to the semi-metal or metal oxide particulates, such particulates that can be selected for use include silica, alumina, titania, zirconia, aluminum silicate, calcium carbonate, and/or other naturally occurring pigments. These compositions can be in various forms and in various shapes; for example, silica can be fumed silica, colloidal silica, precipitated silica, or grounded silica gel, depending on the affect that is desired to achieve. In one embodiment, 30 nm to 100 nm spherical silica particulates can be used to provide a glossy appearance, whereas larger less spherical particulates can provide a less glossy appearance. More irregular shapes, on the other hand, can provide more voids between particles than may be present with tightly packed spherical particulates.

As the semi-metal or metal oxide particulates are not self-adherent, typically, a binder is added to the composition to bind the particulates together. An amount of binder is typically added that provides a balance between binding strength and maintaining particulate surface voids and inter-particle spaces for allowing ink to be received. Exemplary binders that can be used include polyvinyl alcohol, both fully hydrolyzed and partially hydrolyzed, such as Airvol supplied by Air Product or Mowiol supplied by Clariant; modified polyvinyl alcohol, such as acetoacetylated polyvinyl alcohols commercially available as the GOHSEFIMER Z series from Nippon Gohsei; amine modified polyvinyl alcohol; and polyvinyl alcohol modified by silane coupling agent. Other binders that can be used include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof. In some embodiments, it can be more desirable to use polyvinyl alcohol and/or modified polyvinyl alcohol as the interaction between the binder and silica is very strong, resulting in a formed coating that is substantially water insoluble.

To improve the binding strength of the binder, a crosslinking agent, such as boric acid, can be added to the coating composition. For example, by adding boric acid to a system including polyvinyl alcohol, a crosslinking reaction can be carried out with the binder, which provides for improved binding strength. Improved binding strength can lead to reduced cracking at the ink-receiving layer. When a crosslinking agent is used, less binder may be required for use.

Other crosslinking agents that can be used include borate salt, titanium salt, vanadium and chromium salts, melamine formaldehyde, glyoxal, thiourea formaldehyde, and Curesan. Though a purpose of the invention is to remove unreacted water soluble coating formulation additives, this does not mean that only water soluble coating formulation additive must be used, as other formulation additives that do not interfere with print quality can also be used therewith.

In accordance with the above embodiments, the semi-metal oxide or metal oxide particulates can be admixed or treated with multivalent salt(s). Exemplary salts that can be added to coating compositions to provide benefit to the coating composition, but which should be removed from the coating composition if excess amounts are present include aluminum salts, such as aluminum chlorohydrate, and trivalent or tetravalent metal oxides with metals such as aluminum, chromium, gallium, titanium, and zirconium. Alternatively, if such multivalent salt(s) generate unwanted or interfering electrolytes, those electrolytes can alternatively or additionally be removed. In one embodiment, if aluminum chlorohydrate is used, it can be present in the coating composition at from 2 wt % to 20 wt % compared to the silica content, and in a more detailed embodiment, the aluminum chlorohydrate can be present at from 5 wt % to 10 wt %.

In addition to the salt groups that can be added, the semi-metal or metal oxide particulates can also be modified with organic groups. Specifically, organosilane reagents can be added to the surface-activated silica to add additional positively charged moieties to the surface, or to provide another desired function at or near the surface, e.g., ultraviolet absorber, chelating agent, hindered amine light stabilizer, reducing agent, hydrophobic group, ionic group, buffering group, or functionality for a subsequent reaction. As these reagents are primarily organic, they can provide different properties with respect to ink-jet ink receiving properties.

In one embodiment, the organosilane reagents can be amine-containing silanes. In a more detailed embodiment, the amine-containing silanes can include quaternary ammonium salts. Examples of amine-containing silanes include 3-aminopropyltrimethoxysi lane, N-(2-aminoethyl-3-aminopropyltrimethoxysilane, 3-(triethoxysilylpropyl)-diethylenetriamine, poly(ethylene imine)trimethoxysilane, aminoethylaminopropyl trimethoxysilane, aminoethylaminoethylaminopropyl trimethoxysilane, and the quaternary ammonium salts of the amine coupling agents mentioned above. An example of a quaternary ammonium salt organosilane reagent includes trimethoxysilylpropyl-N,N,N-trimethylammonium chloride.

Alternatively, other organosilane coupling agents can be useful for the modification of a silica surface, including bis(2-hydroethyl)-3-aminopropyltriethoxysilane, 3-mercaptopropyltrimethoxysilane, 3-glycidoxypropyltrimethoxysilane, bis(triethoxysilylpropyl)disulfide, 3-aminopropyltriethoxysilane, 3-aminopropylsilsesquioxane, bis-(trimethoxysilylpropyl)amine, N-phenyl-3-aminopropyltrimethoxysilane, N-aminoethyl-3-aminopropylmethyldimethoxysilane, 3-ureidopropyltrimethoxysilane, 3-methacryloxypropyltrimethoxysilane, N-(trimethyloxysilylpropyl)isothiouronium chloride, N-(triethoxysilpropyl)-O-polyethylene oxide, 3-(triethoxylsilyl)propylsuccinic anhydride, 3-(2-imidazolin-1-yl)propyltriethoxysilane, and reagents sold under the trade name SILQUEST (OSI Products), SiventoSilane (Degussa), Dynasylan, and/or Cab-O-Sil M-5 (Cabot Corp.).

Other organosilane reagents can also be used that provide a benefit to a printing system, such as reagents that include an active ligand or moiety. Examples of such active ligands or moieties include those that act as an ultraviolet absorber, chelating agent, hindered amine light stabilizer, reducing agent, hydrophobic group, ionic group, buffering group, or functionality for a subsequent reaction. To illustrate this, Formula 1 provides examples of organosilane reagents that can accordingly be used:

Formula 1

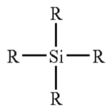

In Formula 1 above, from 0 to 2 of the R groups can be H, $—CH_3$, $—CH_2CH_3$, or $—CH_2CH_2CH_3$; from 1 to 3 of the R groups can be halide or alkoxy; and from 1 to 3 of the R groups can be an active or functional moiety, such as one described previously. If a halide is present, then Formula 1 can be said to be an organohalosilane reagent. If alkoxy is present, then Formula 1 can be said to be an organoalkoxysilane reagent.

An inclusive list of functional moieties that can be attached to the metal or semi-metal oxide surface includes straight or branched alkyl having from 1 to 22 carbon atoms, cyano, amino, halogen substituted amino, carboxy, halogen substituted carboxy, sulfonate, halogen substituted sulfonate, halogen, epoxy, furfuryl, mercapto, hydroxyl, pyridyl, imidazoline derivative-substituted lower alkyl, lower cycloalkyl, lower alkyl derivatives of cycloalkyl, lower cycloalkenyl, lower alkyl derivatives of cycloalkenyl, lower epoxycycloalkyl, lower alkyl derivatives of epoxycycloalkyl, phenyl, alkyl derivatized phenyl, phenoxy, poly(ethylene oxides), poly(propylene oxide), copolymer of polyethyleneoxide and poly(propyleneoxide), vinyl, benzylic halogen, alkyl derivatized phenoxy, quaternary amine, monoethyleneimine, or polyethyleneimine.

In practice, adding a multivalent salt, such as aluminum chloride hydrate, can provide stability to the coating mix prior to application, and reduces the tendency for the receiving layer to be low in gloss. Additionally, as mentioned, boric acid can be added to improve the binding power of the coating composition, thereby reducing the tendency of a dried receiving layer to crack. As described, though the aluminum chlorohydrate and the boric acid provide these benefits, they can also have the negative affect of causing ink-jet inks under perform if present in excess amounts, or if the electrolytes formed therefrom remain in the coating composition or the ink-receiving layer of the resulting print media. For example, pigment-based inks, in the presence of boric acid and aluminum chlorohydrate (or their resulting electrolyte reaction products) on a media substrate, have a tendency to lose their gloss at a higher ink load. Thus, gloss uniformity can suffer. In other words, unreacted or generated high valent salts and acid can work to undesirably coagulate ink. When dye- or pigment-based inks coagulate, color gamut suffers and image scratch resistance will deteriorate. By removing at least a portion of excess or unreacted amounts of such additive(s) from the coating composition, or by removing electrolytes or salts generated from the additives, prior to forming the ink-receiving layer on the media substrate, the benefits of using the additive(s) can be realized, and at the same time, many of the negatives resulting from the presence of residual, excess, or unreacted amounts of such additive(s) that would otherwise remain present in the coating composition can be minimized. Thus, by substantially removing excess acid and excess high valent salts from the coating composition or resulting ink-receiving layer, image quality can be greatly improved.

Regarding removing unwanted additives or generated electrolytes from the coating composition or resulting ink-receiving layer, in accordance with embodiments of the present invention, such removal can occur prior to application of the coating composition. Removal of the unwanted excess additives or generated material prior to application of the coating can be by one of a number of methods, including ultrafiltration, dialysis, ion-exchange, reverse osmosis, and combinations of these processes. By way of example, without being bound by any particular removal method, the process of ultrafiltration is exemplified herein.

Ultrafiltration is a membrane filtration technology that can be used to separate small colloids and large molecules from liquids (such as water) and small molecules. A back pressure can be applied at, for example, 100 psi. Thus, a subject composition is forced against a semi-permeable membrane that allows water molecules and other small molecules to pass, while maintaining larger molecules, such as colloids. Deionized water is added as water is being removed through the membrane wash the colloids and replenish the water content. Typically, the process of ultrafiltration is used for removing particles from a composition at from about 2 nm to about 100 nm, i.e. a process defined as between reverse osmosis and microfiltration. For example, a filter size of about 50 nm or less can remove or lose generated or unreacted electrolytes (about 10 nm), and can keep everything greater than about 70 nm. Typically, with ultrafiltration, organics or colloids over 1,000 MW are retained while passing ions and smaller colloids or organics. Similarly, diafiltration can be used to remove the low molecular weight water soluble species, such as salts or electrolytes, from the solution or dispersion.

The membranes used for both ultra and diafiltration typically have a molecular weight cutoff (MWCO) ranging from 100 to 500,000 Daltons such that species smaller than the rated MWCO of the membrane are capable of passing through the membrane. Further, these membranes also usually have two layers, e.g., a thin (0.1 to 0.5 μm), semi-permeable membrane made from cellulose ester or polyethersulfone and a substructure support material. During manufacturing, the membranes can be cast onto the membrane support. Only the layer of semi-permeable membrane comes in contact with the sample during ultrafiltration or diafiltration. The support material below the membrane does not typically affect the filtration characteristics of the membrane.

In conventional ultrafiltration/microfiltration configurations, a process solution is pressurized, typically at from 10 psi to 70 psi, while in contact with a supported semi-permeable membrane is maintained. Solutes smaller than the MWCO emerge as ultrafiltrate, and the retained molecules are concentrated on the pressurized side of the membrane. Pressure sources such as compressed gas (nitrogen) and peristaltic pump systems are commonly used.

With diafiltration, the target small molecule flows through a membrane in convective flow. The volume of permeate is continuously added to the feed as solvent. The efficiency of removal can be very high, but the properties of the membrane and the process conditions should be chosen carefully.

Still another method of removing low molecular weight electrolytes from aqueous solution or dispersion is dialysis. Dialysis defuses small molecules through a permeable selective membrane that will not allow passage by diffusion of the other constituents of the feed. The concentration of the target molecule in the feed decreases with time. Thus, the efficiency of removal is also decreased and usually takes a longer time to achieve separation results.

In an exemplary embodiment in accordance with the present invention involving removal of excess additive(s) or generated electrolytes prior the application of a coating composition, a media coating can be prepared that exhibits improved light fastness, scratch resistance, and image quality. Such a coating can include a porous pigment, such as fumed silica (about 50 wt % to 85 wt %), as a primary structural particulate component; a multivalent salt, such as aluminum chlorohydrate (about 5 wt % to 8 wt %), which provides a cationic surface charge to the system; and a binder, such as polyvinyl alcohol (about 15 wt % to 20 wt %) to bind the silica and the aluminum chlorohydrate together. To increase the binding power of the polyvinyl alcohol, a crosslinking agent, such as boric acid (about 0.5 wt % to 5 wt %) can be added. The coating mix can be refined by removing excess amounts of the aluminum chlorohydrate by ultrafiltration, for example. Alternatively, aluminum chlorohydrate-treated silica can be treated by ultrafiltration prior to combining with the polyvinyl alcohol and/or crosslinking agent. In one example, ultrafiltration can be carried out using a porous membrane having an average pore size of about 50 nm. In another example, back pressure of about 100 psi can be applied to the composition, and small substances, including undesired electrolytes and/or unreacted additive, will pass through the pores along with the water. As such material is passed through the pores, deionized water can be used to replenish the lost water, thereby refining the coating composition. The coating mix in a more refined state can then be applied on a non-absorbing base or substrate, and subsequently dried. The coat weight can be controlled at from 15 $g/m^2$ to 35 $g/m^2$. In one embodiment, a second coating including more spherical colloidal silica (40 nm to 100 nm) can be applied as an overcoat to provide a glossy and scratch resistant finish. If the second coating is not formulated with ionic compositions or acid, for example, a refining or removing step is not necessary, though such a step is not precluded.

Distinct from removing unwanted additives and/or generated electrolytes prior to coating, a post coating washing step can additionally be carried out. In other words, washing can be carried out after the ink-receiving layer has been formed. Such a washing step can be carried out by bathing, spraying, or by other known washing techniques. Typically, the water can be at about room temperature, though temperatures from about 0° C. to 90° C. can be used. In one embodiment, hot water from 30° C. to 50° C. can be used. The water used can be deionized water, hard water, soft water, or water with additives. For example, the water can include a buffer (0.1 to 1% solids) to control the pH during the washing stage at from pH 5 to 7.5. It has been discovered that washing with low concentration buffer is good for pigment based ink gloss improvement, and only has a slight negative effect on humid bleed. That is because of that most of buffer compounds are low molecular acids and salts. Not every salt can interact with pigment colorant to decrease gloss, but typically, salts deteriorate humid bleed. Whatever water type (with or without additives) is used, the washing step can be used to contribute to the final pH of the media sheet. In one embodiment, the pH of an ink-receiving layer of the media sheet can be from about pH 4 to about pH 7.5. In another embodiment, the pH of the ink-receiving layer can be from about pH 5 to about pH 6. Other additives that can be present in the water include additives that contribute to print quality, such as air fade additives or the like. Examples of air fade additives that can be included are radical scavengers, hindered amines, and/or thio compounds such as thiodiethylene glycol.

The media substrate that can be used can be of any substrate known in the art, and can include papers, overhead projector plastics, coated papers, fabric, art papers, e.g., water color paper, photobase, or the like. The application of the porous coating composition to a media substrate can be by any method known in the art, such as air knife coating, blade coating, gate roll coating, doctor blade coating, Meyer rod coating, roller coating, reverse roller coating, gravure coating, brush coating, sprayer coating, or cascade coating.

In an embodiment, a method of preparing a porous media substrate comprises: a) combining metal or semi-metal oxide particulates with a polymeric binder, wherein the metal or semi-metal oxide particulates are associated with at least one water soluble coating formulation additive, wherein at least a portion of the water soluble coating formulation additive i) is in the form of unreacted additive, or ii) generates undesired electrolytes; b) removing at least a portion of the unreacted additive or undesired electrolytes, either before or after combining the metal or semi-metal oxide particulates with the polymeric binder, thereby forming a refined coating composition; and c) applying the refined coating composition to a media substrate to form an ink-receiving layer having a porous surface, wherein the media substrate includes an inorganic porous media precoat, and wherein the step of applying the refined coating composition to the media substrate comprises overcoating the precoat.

Ink-jet ink compositions that can be used to print on the coated media compositions of the present invention are typically prepared in an aqueous formulation or liquid vehicle which can include water, co-solvents, surfactants, buffering agents, biocides, sequestering agents, viscosity modifiers, humectants, binders, and/or other known additives. Colorants, such as dyes and/or pigments are also present to provide color to the ink-jet ink. In one aspect of the present invention, the liquid vehicle can comprise from about 70 wt % to about 99.9 wt % of the ink-jet ink composition. In another aspect, other than the colorant, liquid vehicle can also carry polymeric binders, latex particulates, and/or other solids.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Preparation of ACH-Treated Silica

To 375 ml of water were added 11 mL of 2N NaOH and 27.9 grams of 50% aluminum chlorohydrate (ACH) under strong agitation. Then, 86.1 grams of fumed silica Cab-o-sil M-5 was added into the dispersion. The product was aged for about 24 hours producing a cationic silica sol having 20 wt % solids. In this embodiment, the aluminum chlorohydrate was used as dispersing agent which converted the silica surface from anionic to cationic, providing a repulsion force with respect to the silica pigments, thereby preventing the sol from flocculating and providing acceptable stability.

Example 2

Refining ACH-Treated Silica Prior to Coating on Media Substrate

An ACH treated silica is prepared by the method described in Example 1. The final wt % of solids is adjusted to about 20%, and the pH of the silica is adjusted to about 3.0. A Vivaflow 200 (by Vivascience, Germany) tangential flow (or cross flow) diafiltration module is used to remove the electrolytes from the silica dispersion. About one liter of the 20% ACH treated silica is then charged to a two liter Erlenmeyer flask, and the flask was immersed to a constant temperature bath at 50° C. The diafiltration is carried out using a 50,000 MWCO polyethersulfone membrane, and a Cole-Parmer peristatic pump-head accepting size 15 tubing and a pressure gauge are attached. The heated silica dispersion is pumped through the membrane and the back pressure is controlled at from 20 psi to 30 psi. To maintain a constant volume and constant solid of the fluid, a reservoir containing deionized water is connected to the system. As water/salt passes through the membrane, the vacuum that is created in the sample reservoir draws deionized water in exchange through the feed tubing from the feed reservoir. The conductivity of the waste aqueous solution is monitored continuously. This process is continued until the conductivity of the waste solution is reduced to within 5 times of the deionized water. In general, this is accomplished with an exchange volume of approximately 5 times of the original sample volume. The cleaned silica dispersion is recovered and cooled to room temperature. Alternatively, reduction is conductivity can be measured based on a decrease in the original conductivity of the coating solution to 20%. Once the cleaned silica dispersion is formed, it can be admixed with a binder composition and coated on a media substrate. By following this process, the conductivity of the particles in the coating composition can be reduced anywhere from about 25% to 75%, which is significant with respect to ink or dye interaction with these coatings.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A method of preparing a porous media substrate, comprising:

forming an aqueous dispersion comprising at least one water soluble coating formulation additive comprising aluminum chlorohydrate;

adding 30-100 nm silica or alumina particulates to said additive dispersion, to form a dispersion comprising unflocculated silica or alumina particulates associated with said additive, and comprising unreacted additive or undesired electrolytes;

combining a polymeric binder with said additive-associated silica or alumina particulates;

removing at least 25-75% of the unreacted additive or undesired electrolytes; and applying a refined coating composition comprising said additive-associated metal or semi-metal oxide particulates and said binder to a media substrate to form an ink-receiving layer having a glossy porous surface and enhanced compatibility with inkjet ink components.

2. The method of claim 1, wherein the binder includes a member selected from the group consisting of polyvinyl alcohol, modified polyvinyl alcohol, and combinations thereof.

3. The method of claim 1, wherein the water soluble coating formulation additive includes an ionic organosilane reagent, said ionic organosilane reagent including an amine moiety.

4. The method of claim 1, wherein the water soluble coating formulation additive includes an acidic component comprising an acidic crosslinking agent.

5. The method of claim 4, wherein the acidic crosslinking agent is boric acid.

6. The method of claim 1, further comprising adding to said refined coating composition an air fade additive configured to improve air fade resistance of an image printed on the porous surface.

7. The method of claim 6, wherein the air fade additive is selected from the group consisting of hindered amines, thio compounds, and combinations thereof.

8. The method of claim 1, wherein the step of removing comprises a process selected from the group consisting of ultrafiltration, dialysis, ion exchange, reverse osmosis, and combination of process thereof.

9. The method of claim 8, wherein the step of removing comprises ultrafiltration.

10. The method of claim 9, wherein the ultrafiltration is carried out using a porous filter having an average pore size from 20 nm to 100 nm.

11. The method of claim 1, wherein the porous surface has a pH from about 4 to about 7.5.

12. The method of claim 11, wherein the porous surface has a pH from about 5 to about 6.

13. The method of claim 1, wherein the step of removing occurs prior to combining the silica or alumina particulates with the polymeric binder.

14. The method of claim 1, wherein, after the applying step, the porous surface is subsequently coated with a second coating that is substantially devoid of water soluble coating formulation additive.

15. The method of claim 1, wherein the media substrate includes an inorganic porous media precoat, and wherein the step of applying the refined coating composition to the media substrate comprises overcoating the precoat.

16. The method of claim 1, further comprising the step of washing the ink-receiving layer.

17. The method of claim 16, wherein the washing step removes additional unreacted or excess additive or undesired electrolytes.

18. The method of claim 1 wherein said removing comprises removing at least a portion of the unreacted additive or undesired electrolytes after combining the silica or alumina particulates with the polymeric binder.

* * * * *